Jan. 11, 1927.
C. A. BREWER
SOIL VIBRATING APPARATUS
Filed August 6, 1924   2 Sheets-Sheet 1
1,614,273
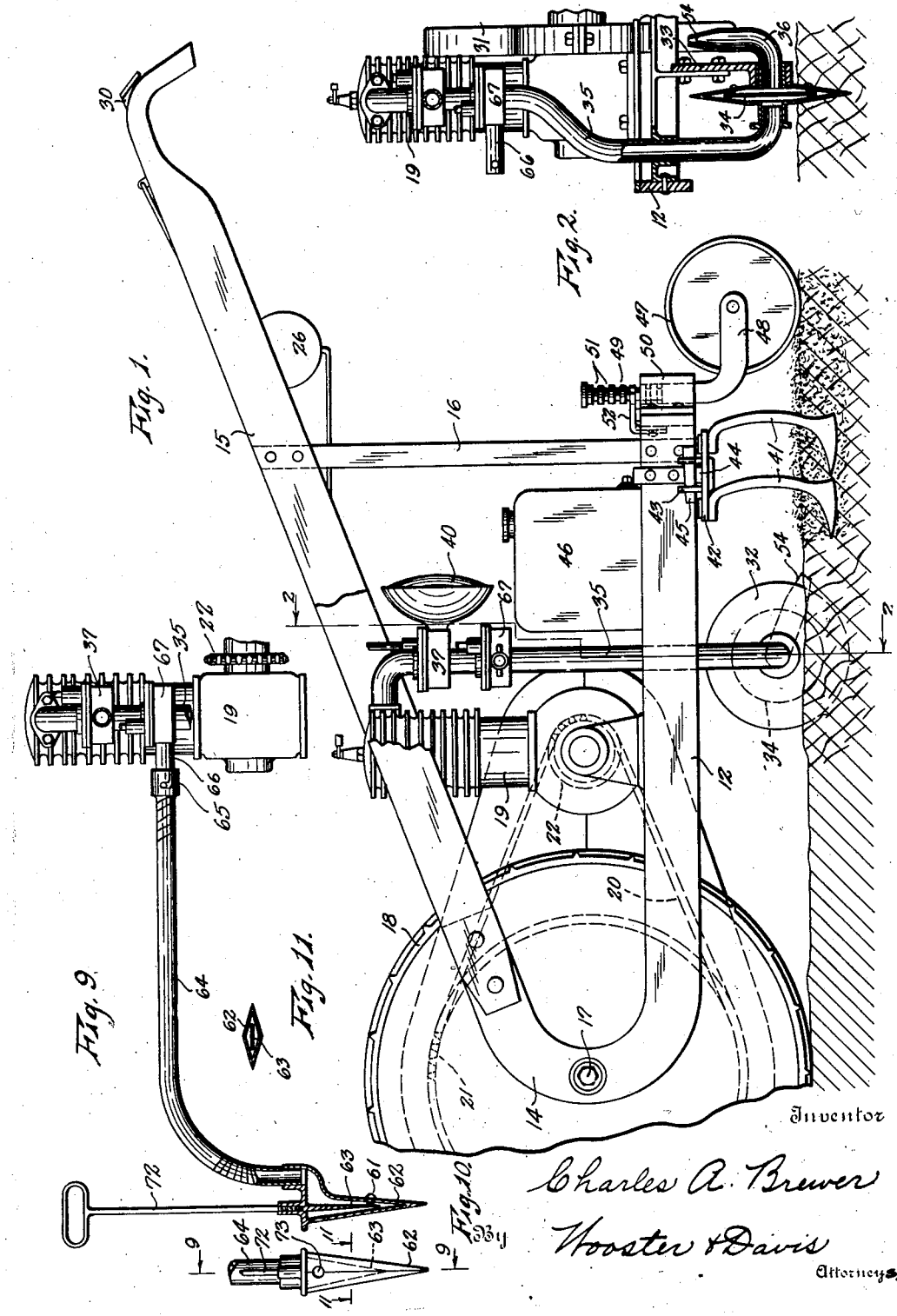
Inventor
Charles A. Brewer
Wooster & Davis
Attorneys Jan. 11, 1927.
C. A. BREWER
SOIL VIBRATING APPARATUS
Filed August 6, 1924    2 Sheets-Sheet 2
1,614,273
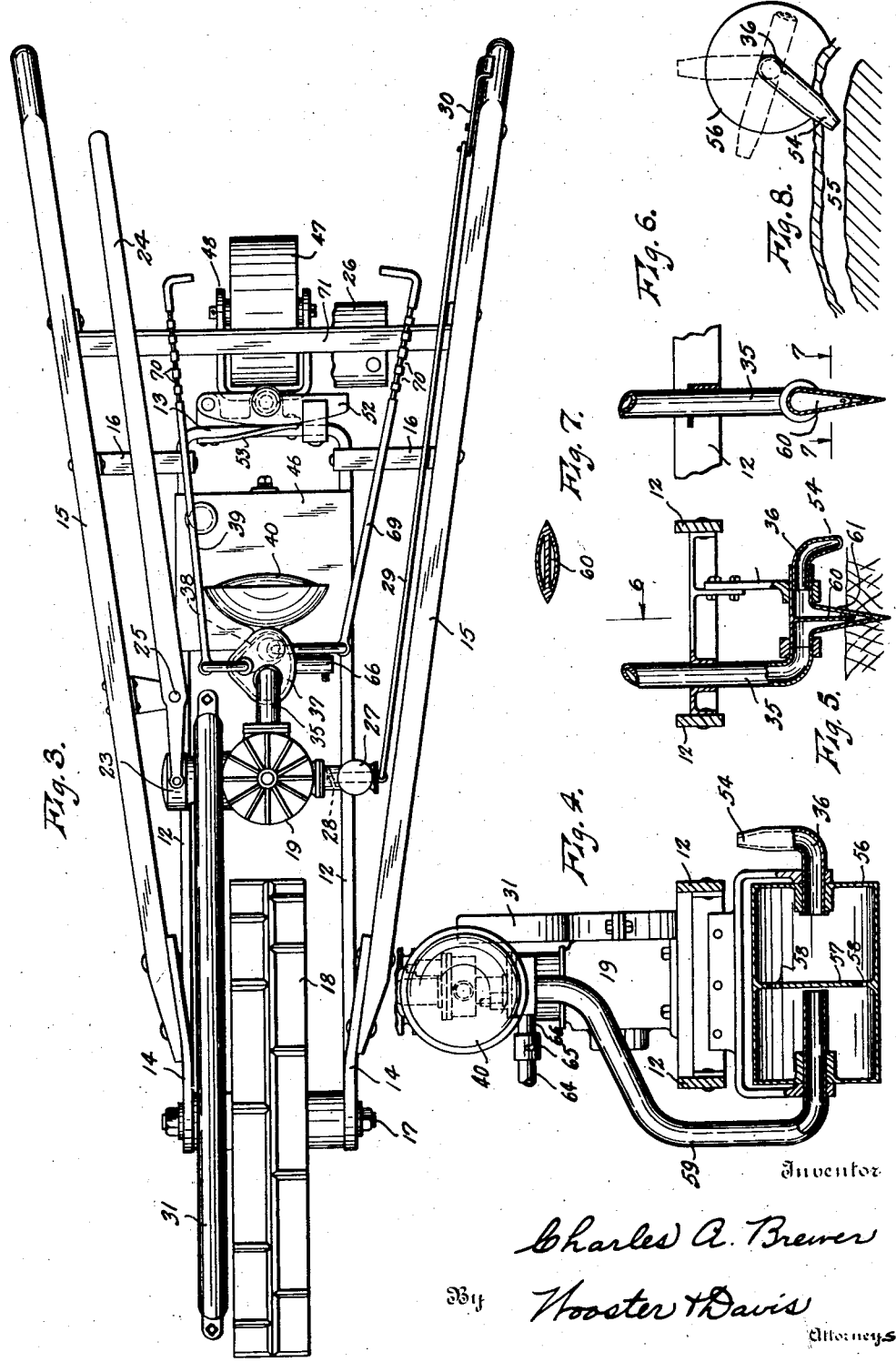

Patented Jan. 11, 1927.

1,614,273

UNITED STATES PATENT OFFICE.

CHARLES A. BREWER, OF NOROTON HEIGHTS, CONNECTICUT.

SOIL-VIBRATING APPARATUS.

Application filed August 6, 1924. Serial No. 730,346.

This invention relates to soil tillage apparatus, and has for an object to provide a device which will vibrate the soil, thus causing it to be broken up and loosened to facilitate entrance of moisture and root growth, and also to rid the soil of certain pests.

It is also an object of this invention to provide a device for carrying out these functions, which will be simple in construction and easy to operate, and which may be used for treating soil for all kinds of plants, trees and shrubs to improve the soil to increase their growth and yield.

With the foregoing and other objects in view, I have devised the construction illustrated in the accompanying drawings forming a part of this specification, similar reference characters being employed throughout the various figures to indicate corresponding elements. In these drawings, Fig. 1 is a side elevation of my device illustrating its use.

Fig. 2 is a transverse section substantially on line 2—2 of Fig. 1

Fig. 3 is a top plan view thereof.

Fig. 4 is a view similar to Fig. 2 showing a slightly different construction of vibrator.

Fig. 5 is a similar view showing a still different construction of vibrator.

Fig. 6 is a transverse section substantially on line 6—6 of Fig. 5.

Fig. 7 is a transverse section substantially on line 7—7 of Fig. 6.

Fig. 8 is a diagrammatical view illustrating the use of the device for exterminating moles.

Fig. 9 is a detail view showing a slightly different construction of device for a special purpose, the vibrator being shown in section substantially on line 9—9 of Fig. 10.

Fig. 10 is a front elevation of the vibrator shown in Fig. 9, and

Fig. 11 is a cross section thereof substantially on line 11—11 of Fig. 10.

Referring to Figs. 1 to 3 inclusive the device, as shown comprises a frame preferably made of a single strip of metal rectangular in cross section. This frame is bent to substantially U-shape to form sides 12 connected together at the rear end of the device by a cross bar 13, and are curved upwardly at their free ends, as shown at 14, with suitable guide handles 15 secured thereto. This frame with the handles carry the various devices making up the apparatus. The handles are also braced and connected to the frame by suitable struts 16. Mounted on the shaft 17 extending between the front ends of the sides of the frame is a drive wheel 18, and carried by the frame to the rear of this wheel is a suitable motor 19, preferably an internal combustion motor, and there is a driving connection from this motor to the wheel, illustrated as a chain 20 running over the sprockets 21 and 22, the large sprocket being connected to the wheel while the small sprocket is connected to the motor through a suitable clutch mechanism 23, shown merely in outline as the specific form of clutch forms no part of my invention. This clutch is controlled by a suitable lever 24 pivoted at 25 and extending to a position easily accessible for manipulation by the operator. A suitable fuel tank for the motor is shown at 26 connected to the usual carburetor 27 with the throttle valve 28 between this carburetor and the motor for controlling the motor. Any suitable means may be provided for controlling this throttle valve, such as a rod 29, connected to a thumb lever 30 in position to be easily operated by the operator. The chain and sprocket drive are preferably enclosed in a suitable casing 31 to keep out dust and dirt.

Carried by the frame is my improved vibrating device. In the form shown in Figs. 1, 2 and 3 it comprises a hollow rotary disc 32 having a sharp edge on its periphery so that it may cut and project into the soil, as indicated. It is mounted to rotate on a suitable supporting bracket 33 carried by the frame. The side walls of this disc are preferably somewhat concave to form an internal cavity in which is a vibrating disc 34 connected to one of the sides of the rotary disc, and the exhaust pipe 35 is directed into this cavity laterally from one side thereof and preferably at the center of the disc. The disc 34 although being connected to one of the sides of the rotary disc 32 is spaced from the walls thereof so that the gases may pass around the edge of this disc and from the rotary element 32 at the opposite side of disc 34 through the outlet pipe 36. Thus the exhaust gases of the motor are directed against one side of the disc 34 at substantially the center thereof, and the pulsating and hammering action of these gases will vibrate the discs 34 and 32. This vibration will be laterally of the plane of the disc, and as the disc is mounted so that it is upright with its plane in the direction of normal movement through the soil the vibration of the disc is in a direction laterally of the direction of movement of the disc through the soil. Thus the soil is thoroughly cracked and loosened and broken up. To regulate the amount of vibration means is provided for controlling the proportion of the exhaust gases which will be discharged into the vibrating element. For this purpose a casing 37 is mounted in the exhaust pipe 35 and has a valve 38 which may be manipulated by a rod 39 to control the proportion of the gases which will pass through the vibrator or will be discharged through the muffler 40.

At the rear of the vibrator I also mount any suitable soil stirring devices, such as cultivator teeth 41. After the soil has been cracked and loosened by the vibrating device it may be easily and thoroughly stirred and broken up by the cultivator teeth. They may be mounted in any suitable way but preferably are carried by a movable plate 42 having openings at its opposite ends for the passage of U-shaped elements 43 arranged to extend on opposite sides of laterally projecting fingers 44 carried by the frame. Tapered pins 45 pass through the arms of the U-shaped elements and rest on the top of the fingers 44. By knocking out these tapered pins the plate and the teeth may be easily removed and another set of tools easily substituted. A tank 46 is mounted on the frame to carry water as a ballast to insure that the vibrator and soil stirring devices are held in the soil. The depth to which these elements project into the soil may be controlled by a suitable swinging wheel 47 mounted in a frame 48 carried by an upright pivot rod 49 extending through a bearing 50 carried by the frame. The rod may be provided with grooves 51 for entrance of a spring pressed pivoted catch element 52 to allow its adjustment to vary its height. The spring for this catch is shown at 53.

The exhaust or outlet pipe 36 is mounted so that it may be swung with its discharge end 54 directed in different directions, that is, it may be directed upwardly, as shown in Fig. 2 or downwardly, as shown in Fig. 1, to discharge the gases against the surface of the soil, or if desired it may be directed into a mole hole 55 to discharge the gases into this hole to poison the moles. It is equally adapted for directing into the burrows of other rodents for the purpose of exterminating them.

In Fig. 4 I have shown a vibrating device which does not project into the soil but merely bears on the top thereof. In this case it comprises a hollow roller 56 having a transverse partition wall 57. This partition wall has openings 58 about the outer edge thereof, and the exhaust pipe 59 from the motor is projected through one end of this roller at substantially the center thereof, to discharge the gases against one side of this partition. By this arrangement the pulsating or hammering action of these exhaust gases will vibrate the roller and thus vibrate the soil with which it is in contact. This device is designed primarily for use on lawns to vibrate the soil, to crack it to facilitate entrance of moisture and also to drive out pests in the soil, such as moles. The discharge pipe 36 is adjustable the same as in the first form to discharge the gases in different directions or into burrows of the moles to destroy them.

In Figs. 5 to 7 I have shown a slightly different construction of vibrator, but intended to be used substantially the same as the vibrator shown in Figs. 1 and 2. This vibrator, however, instead of being a rotary disc is a stationary element with relatively sharp edges so it may be drawn through the soil, and it is tapered substantially as shown. This element is hollow and in the cavity formed thereby is a vibratory baffle plate 60 connected at its free end to one of the walls of the element as I have indicated at 61. The gases from the motor are discharged from the exhaust pipe 35 against one side of this plate, and the pulsating and hammering action thereof will vibrate the plate and the element which is attached thereto. The gases pass around the lower free end of the plate and out through the adjustable outlet pipe 36. This element is drawn through the soil in a direction transverse to the direction of vibration. In Figs. 1, 2 and 5 to 7 but one vibrating element is shown to simplify the illustration, but it is to be understood that the number may be increased as found desirable.

In Figs. 9 to 11 I have shown a vibrator which may be used for vibrating the soil about trees and shrubs to crack and loosen the soil to facilitate entrance of moisture and the penetration of roots through the soil. For this purpose a vibrator 62 is shown similar to that illustrated in Figs. 5 to 7 with a baffle 63 connected to the vibrator for vibrating it. The exhaust gases from the motor are led to the vibrator through a flexible pipe 64 which may be detachably connected to the exhaust pipe 35 from the motor by a suitable detachable connection, such as a bayonet joint 65, on a branch pipe 66. This branch pipe is connected to a suitable valve casing 67 which has a suitable valve, not shown, but similar to the valve 38 and operated in the same manner by a rod 69. The rods 39 and 69 are provided with notches 70 engaging in notches in the cross bar 71 to hold the valves in different positions. A suitable handle 72 is connected to the vibrator 62 so that it may be moved from place to place about the tree or the shrub and forced into the ground to vibrate it and break it up. The gases are discharged through the opening 73. Of course in the use of this latter device the clutch 23 is thrown out so that the motor is used only to supply exhaust gases for operating the vibrator.

Having thus set forth the nature of my invention, what I claim is:

1. In a soil vibrating apparatus, a vibratory element arranged in contact with the soil, and means for progressively directing an explosive fluid in an expanding state against said element in separate charges in rapid succession to vibrate the same.

2. In a soil vibrating apparatus, a vibratory element arranged in contact with the soil, an internal combustion engine, and means for directing exhaust gases from said engine against said element to vibrate the same.

3. In a soil vibrating apparatus, a hollow vibratory element arranged in contact with the soil, and means for progressively introducing an explosive fluid in an expanding state into said element in separate charges in rapid succession to vibrate the same.

4. In a soil vibrating device, a hollow vibratory element arranged in contact with the soil, an internal combustion motor, and means for introducing exhaust gases from the motor into said element in separate charges in rapid succession to vibrate the same.

5. In a soil vibrating apparatus, a vehicle, a vibratory device carried by the vehicle in contact with the soil, an internal combustion engine for advancing the vehicle and device, and means for directing exhaust gases from the motor against said device to vibrate said device.

6. In a soil vibrating apparatus, a vehicle, a hollow vibratory device carried by the vehicle in contact with the soil, an internal combustion motor for advancing the vehicle and said device, and means for introducing exhaust gases from the motor into said device in separate charges in rapid succession to vibrate the same.

7. In a soil working device, a vibratory element arranged to project into the soil, means for advancing said element through the soil, and means for progressively directing an explosive fluid in an expanding state against said element in separate charges in rapid succession to vibrate the same as it passes through the soil.

8. In a soil working device, a hollow vibratory element arranged to project into the soil, means for advancing said element through the soil, and means for progressively functioning an explosive fluid and introducing the resultant gases into said element in an expanding state in separate charges in rapid succession to vibrate said element as it passes through the soil.

9. In a soil working device, a vibratory element arranged to project into the soil, an internal combustion motor, means for advancing the element through the soil and means for using exhaust gases from the motor to vibrate said element as it passes through the soil.

10. In a soil working device, a vehicle, a vibratory element mounted on the vehicle and arranged to project into the soil, an internal combustion motor for advancing said vehicle and passing said element horizontally through the soil, and means for using exhaust gases from the motor for vibrating said element as it passes through the soil.

11. In a soil working device, a vehicle, a hollow vibrating element mounted on said vehicle and arranged to project into the soil, an internal combustion motor mounted on the vehicle for advancing the same and passing said element horizontally through the soil, and means for directing exhaust gases from the motor into said element in separate charges in rapid succession to vibrate the same as it passes through the soil.

12. In a soil working device, a vehicle, a hollow upright rotary disc carried by the vehicle and projecting into the soil and mounted on said vehicle, a plate mounted in said disc, an internal combustion motor mounted on said vehicle to advance the same and also advance the disc through the soil, and means for directing exhaust gases from the motor against said plate to vibrate the disc as it passes through the soil.

13. In a soil working device, a vibrating element arranged to project into the soil, means for advancing said element through the soil, means for vibrating said element laterally of its direction of movement through the soil as it passes therethrough, and means to the rear of the vibrating device for stirring the soil.

In testimony whereof I affix my signature.

CHARLES A. BREWER.